United States Patent

Zheng et al.

[11] Patent Number: 5,963,686
[45] Date of Patent: Oct. 5, 1999

[54] LOW COST, EASY TO BUILD PRECISION WAVELENGTH LOCKER

[75] Inventors: Yu Zheng, Sunnyvale; David Li, Mountain View; Xiaobing Luo, Sunnyvale, all of Calif.

[73] Assignee: Oplink Communications, Inc., San Jose, Calif.

[21] Appl. No.: 08/881,241

[22] Filed: Jun. 24, 1997

[51] Int. Cl.[6] .................................................. G02B 6/26
[52] U.S. Cl. .................................. 385/27; 385/43; 385/45
[58] Field of Search ........................ 385/27, 43, 45, 385/46

[56] References Cited

U.S. PATENT DOCUMENTS

| | | | |
|---|---|---|---|
| 5,268,979 | 12/1993 | Weidman | 385/42 |
| 5,319,435 | 6/1994 | Melle et al. | 356/32 |
| 5,459,804 | 10/1995 | Stowe | 385/42 |
| 5,642,448 | 6/1997 | Pan et al. | 385/31 |

*Primary Examiner*—John D. Lee
*Assistant Examiner*—Victoria D. Hao
*Attorney, Agent, or Firm*—Sawyer & Associates

[57] ABSTRACT

A system and method providing a wavelength locker is disclosed. The method and system provide a high uniformity, low polarization sensitivity optical coupler. The optical coupler further comprises a first outer fiber and a second outer fiber. The first outer fiber and the second outer fiber each have a first portion. The method and system further provide a filter coupled to the first portion of the first outer fiber. The method and system further provide a first mechanism coupled to the filter for detecting intensity and providing a first resultant. The method and system further provide a second mechanism coupled to the second portion of the second outer fiber. The second mechanism detects intensity and provides a second resultant.

13 Claims, 2 Drawing Sheets

LOW COST, EASY TO BUILD PRECISION WAVELENGTH LOCKER

FIELD OF THE INVENTION

The present invention relates to a method and system for providing a wavelength locker and more particularly to a method and system for implementing a wavelength locker which is low in cost and relatively simple to build.

BACKGROUND OF THE INVENTION

Conventional wavelength lockers monitor and control the wavelength of light produced by a light source. Conventional light sources are lasers, often distributed feedback Bragg reflective ("DFB") lasers. The laser is typically tuned to produce light of a predetermined wavelength, $\lambda_o$. In reality, some portion of light produced by the laser does not have wavelength $\lambda_o$. However, the distribution of wavelengths produced should be centered around $\lambda_o$ and not spread over a large range of wavelengths.

As the laser is used, the resonant characteristics of the cavity change. Consequently, the wavelength of the light produced by the laser may drift from the predetermined wavelength. In other words, the distribution of wavelengths produced may not be centered around $\lambda_o$. Wavelength lockers monitor the wavelength of the light produced by the laser and control the laser to produce light centered around $\lambda_o$.

In some wavelength lockers, wavelength of the incident light is Monitored using a diffraction grating. The diffraction grating is carefully aligned so that most of the light having wavelength $\lambda_o$ is transmitted in a particular direction. A small portion of light if same wavelengths is diffracted at an angle from the direction of propagation of light having the predetermined wavelength. The angle through which the small portion of light having wavelength $\lambda_o$ is diffracted depends on the design of the grating.

In such conventional wavelength lockers, a pair of filters are aligned at a predetermined angle from the direction of propagation of light having the predetermined wavelength. One filter is in the direction of propagation of light having a wavelength equal to $\lambda_o+\Delta$ where $\Delta$ is a small change in the wavelength. The other filter is in the direction of propagation of light having a wavelength equal to $\lambda_o-\Delta$. Each filter has a photodetector associated with it.

When the laser is producing light centered around the predetermined wavelength, $\lambda_o$ the intensity at the photodetectors is the same. When the light source is not producing Right centered around $\lambda_o$, then the intensity of light at the photodetectors is different. The wavelength locker uses this information to adjust the characteristics of the laser, ensuring that light centered around the wavelength $\lambda_o$ is produced.

Although the conventional wavelength locker functions, a diffraction grating is typically expensive. In addition, each filter adds a cost to the system. Finally, the diffraction grating requires very precise alignment, making fabrication of the wavelength locker more difficult. Although a conventional wavelength locker may be made slightly less expensive by using a crystal in lieu of a diffraction grating, the crystal still adds a significant cost to the wavelength locker. In addition, a crystal must often be ordered from a vendor outside of the maker of the wavelength locker.

Accordingly, what is needed is a system and method for producing a wavelength locker which is cheaper and simpler to build. The present invention addresses such a need.

SUMMARY OF THE INVENTION

The present invention provides a method and system for providing a wavelength locker. The method and system provide a high uniformity, low polarization sensitivity optical coupler. The optical coupler further comprises a first outer fiber and a second outer fiber. The first outer fiber and the second outer fiber each have a first portion. The method and system further provide a filter coupled to the first portion of the first outer fiber. The method and system provide a first means coupled to the filter for detecting intensity and providing a first resultant. The method and system further provide a second means coupled to the second portion of the second outer fiber. The second means detects intensity and provides a second resultant.

According to the system and method disclosed herein, the present invention provides a wavelength locker which is cheaper and easier to build, thereby increasing overall system performance.

DETAILED DESCRIPTION OF THE INVENTION

The present invention relates to an improvement in wavelength lockers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
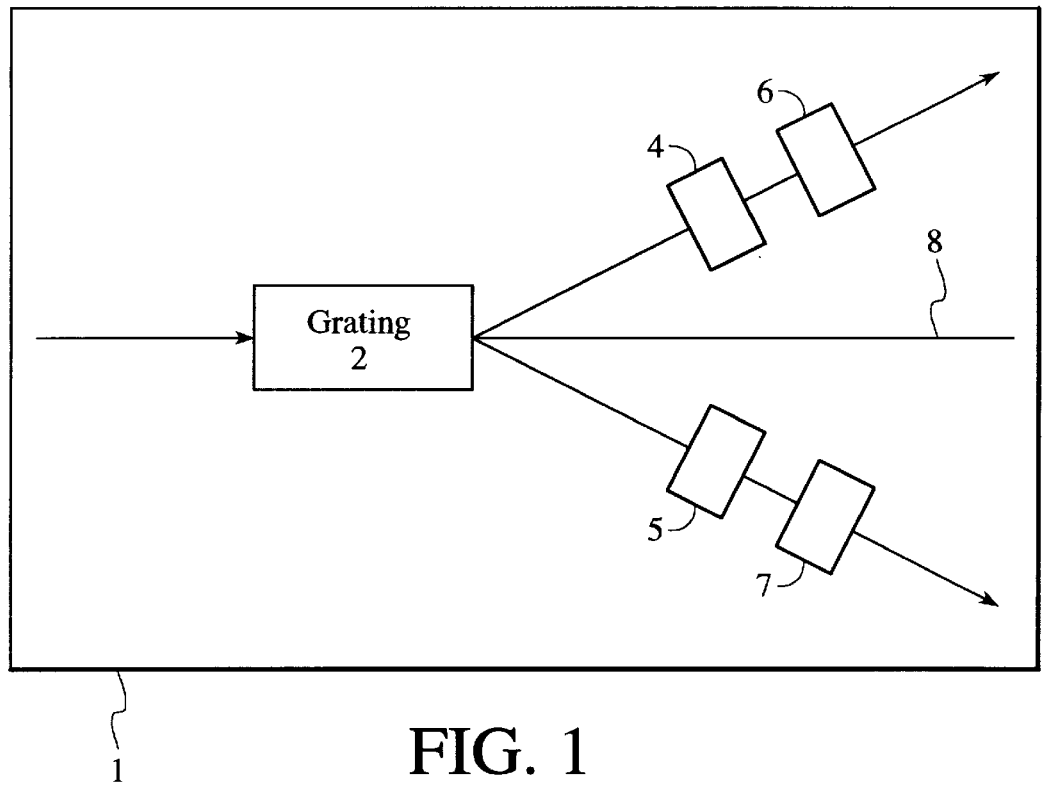
FIG. 1 is a block diagram of a conventional wavelength locker.

FIG. 1 is a block diagram of a conventional wavelength locker 1. The wavelength locker 1 monitors the wavelength using a diffraction grating 2. The diffraction grating 2 is carefully aligned so that most of the light of the predetermined wavelength, $\lambda_o$, is transmitted in a particular direction 8. A small portion of light is diffracted at an angle from the direction of propagation of most of the light having wavelength $\lambda_o$. The angle through which light of another wavelength is diffracted depends on the design of the grating.

The conventional wavelength locker 1, also includes two filters 4 and 5. The filters 4 and 5 are aligned at a predetermined angle from the direction of propagation of light having the predetermined wavelength, $\lambda_o$. The filter 4 is in the direction of propagation of light having a wavelength $\lambda_o+\Delta$ where $\Delta$ is a small change in the wavelength. The filter 5 is in the direction of propagation of light having a wavelength equal to $\lambda_o-\Delta$ where $\Delta$. Each of the filters 4 and 5 has a photodetector 6 and 7, respectively, associated with it.

Figure 2A:
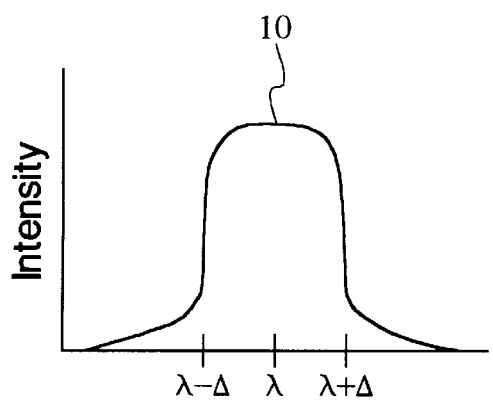
FIG. 2a is a diagram of the distribution light produced by a light source as desired.
Figure 2B:
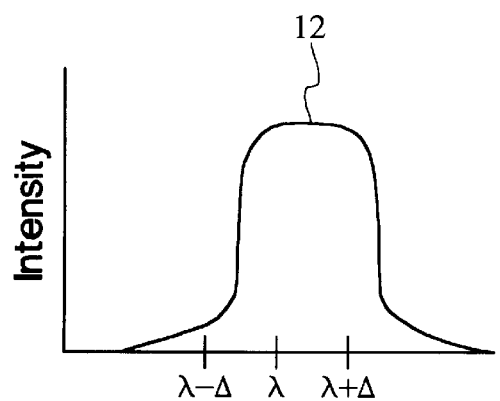
FIG. 2b is a diagram of the distribution of light produced by the light source where the light has drifted from the desired characteristics.

FIG. 2a depicts a plot 10 of intensity versus wavelength when the light incident to the diffraction grating 2 is producing light at the predetermined wavelength, $\lambda_o$. Consequently, the plot 10 is centered around $\lambda_o$. Therefore, the intensity at the wavelength $\lambda_o-\Delta$ where $\Delta$ is the same as the intensity at the wavelength $\lambda_o+\Delta$ where $\Delta$. FIG. 2b depicts a plot 12 of intensity versus wavelength for a laser which has drifted. As a result, the intensity is no longer centered around the predetermined wavelength, $\lambda_o$. The intensity at $\lambda_o-\Delta$ is less than the intensity at $\lambda_o+\Delta$.

Referring back to FIG. 1, when the light incident to the wavelength locker 1 is centered around $\lambda_o$, the intensity at the photodetectors 6 and 7 is the same. When the light source is not producing light centered around $\lambda_o$, then the intensities of light at the photodetectors 6 and 7 are different. For example, when the light source produces the spectrum shown in FIG. 2b, the intensity at photodetector 6 is greater than the intensity at photodetector 7.

The conventional wavelength locker 1 typically monitors the difference in intensities at the photodetector 6 and 7. Where the difference is zero, the light source is providing light having wavelength $\lambda_o$. Where the difference in intensities is nonzero, the wavelength of light produced by the light source has drifted. Depending on whether the difference in intensities is positive or negative, the direction of the drift in the wavelength can be determined. The wavelength locker 1 can then use this information to adjust the parameters of the light source so that the light source produces light having wavelength $\lambda_o$.

Although the conventional wavelength locker I functions, one of ordinary skill in the art will recognize that the wavelength locker 1 is expensive and difficult to fabricate. The diffraction grating 2 is typically expensive. En addition, each filter 4 and 5 adds a cost to the system. Finally, the diffraction grating 2 requires very precise alignment. Although the conventional wavelength locker 1 may be made slightly less expensive by using a crystal in lieu of the diffraction grating 2, the crystal still adds a significant cost to the wavelength locker. In addition, a crystal must often be ordered from a vendor outside of the maker of the wavelength locker.

The present invention provides for a method and system for providing a low cost, easy to build wavelength locker. The present invention will be described in terms of a wavelength locker in which two intensities are monitored and only one filter is utilized. However, one of ordinary skill in the art will readily recognize that this method and system will operate effectively for other numbers of filters and intensities.

Figure 3:
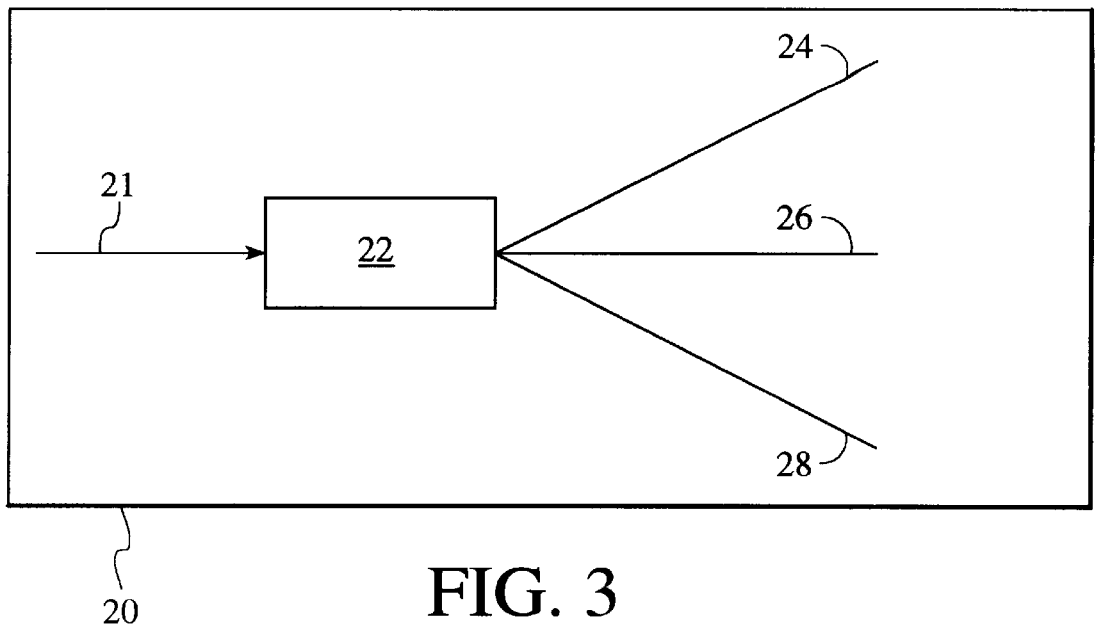
FIG. 3 is a block diagram depicting a 1×3 optical coupler made in accordance with the method and system.

To more particularly illustrate the method system in accordance with the present invention, refer now to FIG. 3 depicting a block diagram of a high uniformity, low polarization sensitivity 1×3 optical coupler 20. Fabrication of the optical coupler 21 is described in U.S. patent application Ser. No. 08/881,242 entitled "HIGH UNIFORMITY LOW POLARIZATION SENSITIVITY 1×N OPTICAL COUPLER, assigned to the assignee of the present invention.

Briefly, the optical coupler 20 is formed by placing three optical fibers substantially parallel and in close proximity. The center fiber is composed of a second portion 21 and a first portion 26. A signal is input to the second portion 21 of the center fiber. The output signal is monitored at the end of first portion 26 of the center fiber. The three optical fibers are then heated and drawn until the output signal of the center fiber reaches a predetermined value. This procedure causes the three optical fibers to fuse at a joint 22. A portion of each of the outer fibers is then removed, leaving sections 24 and 28 of the outer optical fibers.

Because of the way in which the optical coupler 20 is formed, the signals through each of the sections 24 and 28 will be symmetric. In other words, the optical coupler will have high uniformity. Consequently, the same intensity should be transmitted through each of the sections 24 and 28. In a preferred embodiment of the optical coupler 20, sections 24 and 28 transmit approximately three percent of the incident light, while section 26 transmits approximately ninety four percent of the incident light. In addition to high uniformity, the optical coupler 20 has low polarization sensitivity.

Figure 4:
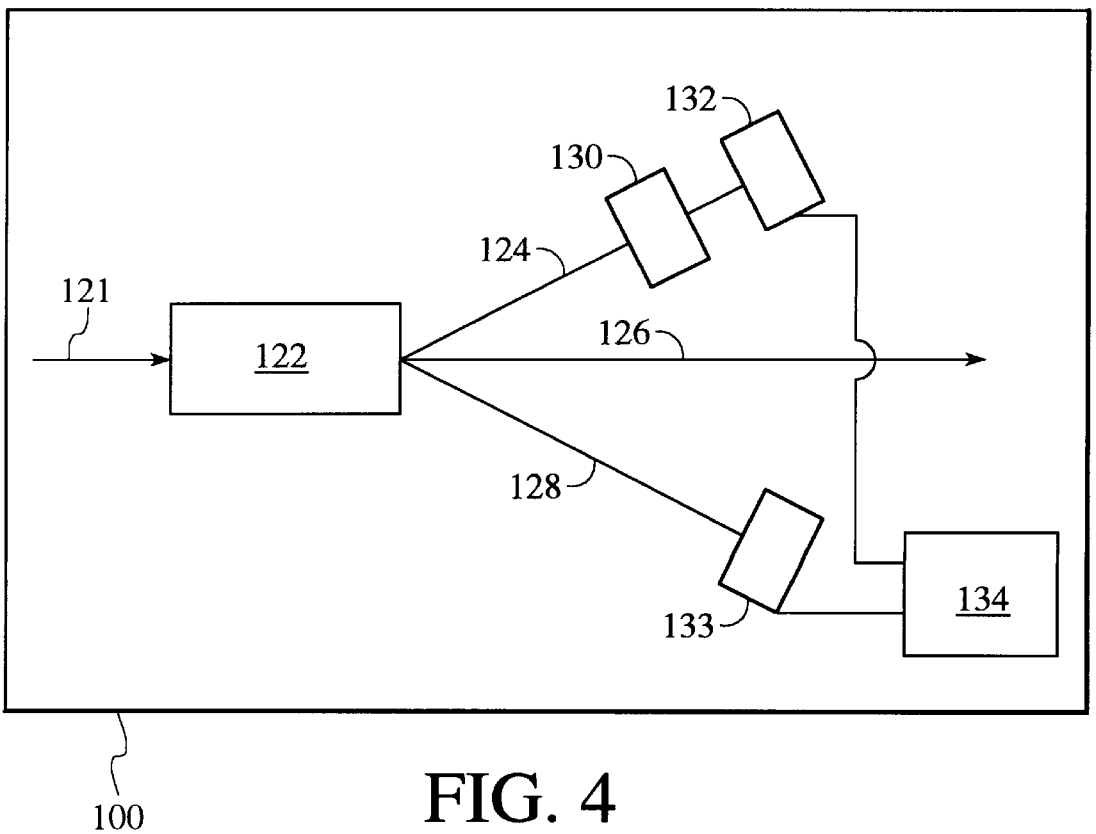
FIG. 4 is a block diagram depicting a wavelength locker made in accordance with the method and system.

Referring now to FIG. 4, the optical coupler 20 is used in a wavelength locker 100 in accordance with the method and system. The portions of the optical coupler are labeled similarly in FIG. 4 as in FIG. 3. Consequently, in FIG. 4, the second section of the center fiber is labeled 121, the joint is denoted by 122, the sections of the outer fibers are labeled 124 and 128, and the first section of the center fiber is labeled 126. The sections 124 and 128 should carry light of equal intensities. Where $I_0$ is the incident intensity, the intensity in each of the sections 124 and 128 is $r*I_0$. The intensity through section 126 is, therefore, $(1-2r)*I_0$. In a preferred embodiment, r is approximately three one hundredths.

The wavelength locker 100 also includes a filter 130 and two photodetectors 132 and 133. The filter 130 reduces the intensity of light by a function, F(x), where x is the wavelength of the incident light. The intensity of light at the photodetector 132 is, therefore, $r*F(x)*I_0$. Where the light source, not shown, produces light having the predetermined wavelength, $\lambda_o$ the filter 130 should reduce the intensity of light transmitted through the section 124 by a factor $F(\lambda_o)$. As a result, the intensity at the photodetector 132 is $r*F(\lambda_o)*I_0$ when the light source produces light of the predetermined wavelength, $\lambda_o$.

There is no filter prior to photodetector 133. Thus, intensity of light at the photodetector 133 is $r*I_0$, the same as in the section 128. The wavelength locker compares the signals from photodetectors 132 and 133 in comparator 134. In a preferred embodiment, the comparator 134 provides the ratio of the intensities at the photodetectors 132 and 133.

The ratio of the intensity at photodetector 132 to the intensity at photodetector 133 is F(x) where x is the wavelength of the incident light. Thus, if the light source is producing light having the predetermined wavelength, $\lambda_o$ the ratio in intensities is $F(\lambda_o)$. However, if the light source is producing light of another wavelength, the ratio of the intensities at photodetectors 132 and 133 would drift from this value. Depending on the value of F(x), the direction in which the wavelength of light produced by the light source drifted can be determined. The wavelength locker 100 can then use this information to control the parameters of the light source so that light wavelength $\lambda_o$ is produced.

Note that although conventional optical couplers were previously available, most conventional optical couplers do not have sufficiently high uniformity to be used in conjunction with the method and system. In addition, the optical coupler 20 utilized is relatively low in cost and simple to assemble.

A method and system has been disclosed for providing a low cost, easy to fabricate optical coupler. Unlike the conventional wavelength locker 1, the wavelength locker 100 in accordance with the method and system does not require precise alignment. This makes fabrication easier. Also note that because the ratio of the intensities at the photodetectors 132 and 133 are compared, the resultant depends only on the input wavelength. The resultant does not, therefore, dependent on intensity. Finally, because only one filter and two photodetectors are used, the cost of the wavelength locker 100 is further reduced. As a result, the entire cost of the wavelength locker 100 is lower.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing a wavelength locker comprising the steps of:

providing a high uniformity, low polarization sensitivity optical coupler for splitting an optical signal including at least one wavelength, the optical coupler further comprising a first outer fiber, a center fiber, and a second outer fiber, the first outer fiber and the second outer fiber each having a first portion, the first portion of the first outer fiber for carrying a first portion of the optical signal, the first portion of the second outer fiber for carrying a second portion of the optical signal;

providing a filter coupled to the first portion of the first outer fiber;

providing a first means coupled to the filter, the first means for detecting intensity and providing a first resultant; and providing a second means coupled to the first portion of the second outer fiber, the second means for detecting intensity and providing a second resultant wherein the optical signal is not split based on the at least one wavelength.

2. The method of claim 1 wherein the step of providing the optical coupler further comprising the steps of:

placing a plurality optical fibers substantially parallel and in close proximity, the plurality of optical fibers further comprising the center fiber, the first outer fiber, and the second outer fiber, the first outer fiber and the second outer fiber each having a second portion, and the center fiber having a first end and a second end;

providing an input signal to the second end of the center fiber;

monitoring an output signal at the first end of the center fiber;

heating and drawing the plurality of optical fibers until the output signal of the center fiber reaches a predetermined value; and removing the second portion of each of the first and second outer fibers.

3. The method of claim 2 further comprising the step of:

providing comparing means coupled to the first detecting means and the second detecting means, the comparing means for comparing the first resultant to the second resultant.

4. The method of claim 3 wherein the step of providing comparing means further comprises the step of:

providing means for providing a ratio of the first resultant to the second resultant.

5. The method of claim 4 wherein the step of heating and drawing the plurality of optical fibers further comprises the step of:

heating the plurality optical fibers using a combination of oxygen and hydrogen gas and drawing the plurality of optical fibers until the output signal at the second end of the center fiber reaches the predetermined value.

6. The method of claim 5 wherein the predetermined value is approximately ninety four percent of an input intensity.

7. A system for providing a wavelength locker comprising:

means for providing a high uniformity, low polarization sensitivity optical coupler for splitting an optical signal having at least one wavelength, the optical coupler having a first outer fiber, a center fiber, and a second outer fiber, the first outer fiber and the second outer fiber each having a first portion, the first portion of the first outer fiber for carrying a first portion of the optical signal, the first portion of the second outer fiber for carrying a second portion of the optical signal;

means for providing a filter coupled to the first portion of the first outer fiber;

means for providing a first means coupled to the filter, the first means for detecting intensity and providing a first resultant; and means for providing a second means coupled to the first portion of the second outer fiber, the second means for detecting intensity and providing a second resultant wherein the optical signal is not split based on the at least one wavelength.

8. The system of claim 7 wherein the optical coupler providing means further comprise:

means for placing a plurality of optical fibers substantially parallel and in close proximity, the plurality of optical fibers further including the center fiber, the first outer fiber, and the second outer fiber, the first outer fiber and the second outer fiber each having a second portion, the center fiber having a first end and a second end;

means for providing an input signal to the second end of the center fiber;

means for monitoring an output signal at the first end of the center fiber;

means for heating and drawing the plurality of optical fibers until the output signal of the center fiber reaches a predetermined value; and means for removing the second portion of each of the first and second outer fibers.

9. The system of claim 8 further comprising:

means for providing comparing means coupled to the first detecting means and the second detecting means, the comparing means for comparing the first resultant to the second resultant.

10. The system of claim 9 wherein the comparing means further comprise:

means for providing a ratio of the first resultant to the second resultant.

11. The system of claim 10 wherein the means for heating and drawing the plurality of optical fibers further comprises:

means for heating the plurality optical fibers using a combination of oxygen and hydrogen gas and drawing the plurality of optical fibers until the output signal at the second end of the center fiber reaches the predetermined value.

12. The system of claim 11 wherein the predetermined value is approximately ninety four percent of an input intensity.

13. A wavelength locker comprising:

a high uniformity, low polarization sensitivity optical coupler for splitting an optical signal having at least one wavelength, the optical coupler having a center fiber, first outer fiber, and a second outer fiber, the first outer fiber and the second outer fiber each having a first portion, the central fiber for receiving an optical signal, the first portion of the first outer fiber for carrying a first portion of the optical signal, and the first portion of the second outer fiber for carrying a second portion of the optical signal;

a filter optically coupled to the first portion of the first outer fiber;

a first photodetector optically coupled to the filter, the first photodetector for detecting a first intensity of the first portion of the optical signal and providing a first resultant; and a second photodetector optically coupled to the first portion of the second outer fiber, the second photodetector for detecting an intensity of the second portion of the optical signal and providing a second resultant wherein the optical signal is not split based on the at least one wavelength.

* * * * *